(12) United States Patent
Olson et al.

(10) Patent No.: US 6,738,210 B1
(45) Date of Patent: May 18, 2004

(54) AMPLITUDE DETECTION FOR FULL BAND SERVO VERIFICATION

(75) Inventors: Alan R. Olson, Cottage Grove, MN (US); Denis J. Langlois, River Falls, WI (US)

(73) Assignee: Imation Corp., Oakdale, MN (US)

(*) Notice: Subject to any disclaimer, the term of this patent is extended or adjusted under 35 U.S.C. 154(b) by 214 days.

(21) Appl. No.: 09/906,185

(22) Filed: Jul. 16, 2001

(51) Int. Cl.[7] .............................. G11B 5/09; G11B 5/584
(52) U.S. Cl. ........................ 360/53; 360/75; 360/77.12
(58) Field of Search .......................... 360/77.12, 53, 360/75, 77.01

(56) References Cited

U.S. PATENT DOCUMENTS 5,689,384 A    11/1997   Albrecht et al.
6,031,673 A  * 2/2000   Fasen et al. .................. 360/53

FOREIGN PATENT DOCUMENTS

WO        WO 00/51109         8/2000

* cited by examiner

Primary Examiner—David Hudspeth
Assistant Examiner—Dan I. Davidson
(74) Attorney, Agent, or Firm—Eric D. Levinson (57) ABSTRACT

The invention provides techniques for verifying that a servo pattern has been properly recorded. For example, the amplitude of a signal corresponding to magnetic servo patterns can be detected and then compared to a threshold to determine whether the servo patterns were properly recorded. The signal strength may be determined for a servo band that includes multiple servo tracks. To enable this determination, a magnetic head may be designed to have sufficient width to enable the head to detect magnetic signal strength corresponding to more than one servo track.

15 Claims, 7 Drawing Sheets

AMPLITUDE DETECTION FOR FULL BAND SERVO VERIFICATION

TECHNICAL FIELD

The invention relates to magnetic storage media and, in particular, to magnetic storage media having pre-written servo patterns.

BACKGROUND

Magnetic storage media having pre-written servo patterns are often used for storage and retrieval of data. For example, magnetic tape media often have pre-recorded servo patterns to enable higher data storage density on the tape. Magnetic tape media remains an economical medium for storing large amounts of data. For example, magnetic tape cartridges, or large spools of magnetic tape, are often used to back up large amounts of data for large computing centers. Magnetic tape cartridges also find application in the backup of data stored on smaller computers such as desktop or laptop computers. Other magnetic storage media, such as magnetic disks, may also utilize pre-recorded servo patterns to increase storage densities.

Servo patterns are referred to as pre-recorded when they are recorded during the fabrication of the media. In other words, pre-recorded servo patterns are servo patterns recorded in the media prior to the media being used for storage of data. These pre-recorded servo patterns allow the media to achieve higher storage densities because the servo patterns enable positions on the media to be located with greater precision. In other words, servo patterns facilitate the ability to pinpoint locations on media surfaces with greater accuracy. Thus, smaller amounts of media surface can be used to store units of data.

SUMMARY

In general, the invention is directed to techniques for verifying that servo patterns have been properly recorded. For example, the amplitude of a signal corresponding to magnetic servo patterns can be detected and then compared to a threshold to determine whether the servo patterns were properly recorded. The signal strength may be determined for a full servo band that includes multiple servo tracks. To enable this determination, a read head can be designed to have sufficient width to enable the head to detect magnetic signal strength corresponding to more than one servo track.

In some embodiments, the invention may involve a method for verifying that a servo pattern has been properly recorded. The method may include recording magnetic servo patterns on a magnetic medium and detecting an amplitude of a signal corresponding to the magnetic servo patterns. For example, the invention may be used to verify servo patterns on magnetic tape. In that case, the method may include un-spooling magnetic tape, recording magnetic servo patterns on the magnetic tape, verifying the magnetic servo pattern prior to re-spooling the magnetic tape, and re-spooling the magnetic tape.

In other embodiments, the invention provides a magnetic head having sufficient width to enable the head to simultaneously detect magnetic signal strength corresponding to more than one servo track. For example, the magnetic head may form part of a servo writing system. The system may include at least one first magnetic head that writes servo patterns. The system may also include a second magnetic head having sufficient width to enable the second head to simultaneously detect magnetic signal strength corresponding to more than one servo track.

Performing servo verification provides several advantages. For example, if dust or debris collect in one or more components that perform the servo writing, the servo patterns may not be properly written. Performing servo verification, however, can ensure that these problems are detected relatively early in the manufacturing process. If problems are detected, the servo writing process can be fixed, thereby avoiding the creation of defective or inferior quality magnetic storage media. In addition, time and energy can be saved as servo writing problems are identified more quickly by a verification process.

Additional details of these and other embodiments are set forth in the accompanying drawings and the description below. Other features, objects, and advantages of the invention will be apparent from the description and drawings, and from the claims.

DETAILED DESCRIPTION

The invention provides techniques for verifying that a servo pattern has been properly recorded in a magnetic medium. The invention may be implemented with any magnetic medium that has pre-recorded servo patterns. For example, the invention could be used to verify servo patterns on magnetic tape media as well as magnetic disks or other magnetic media. Many details of the invention, however, will be explained in the context of magnetic tape media.

Figure 1:
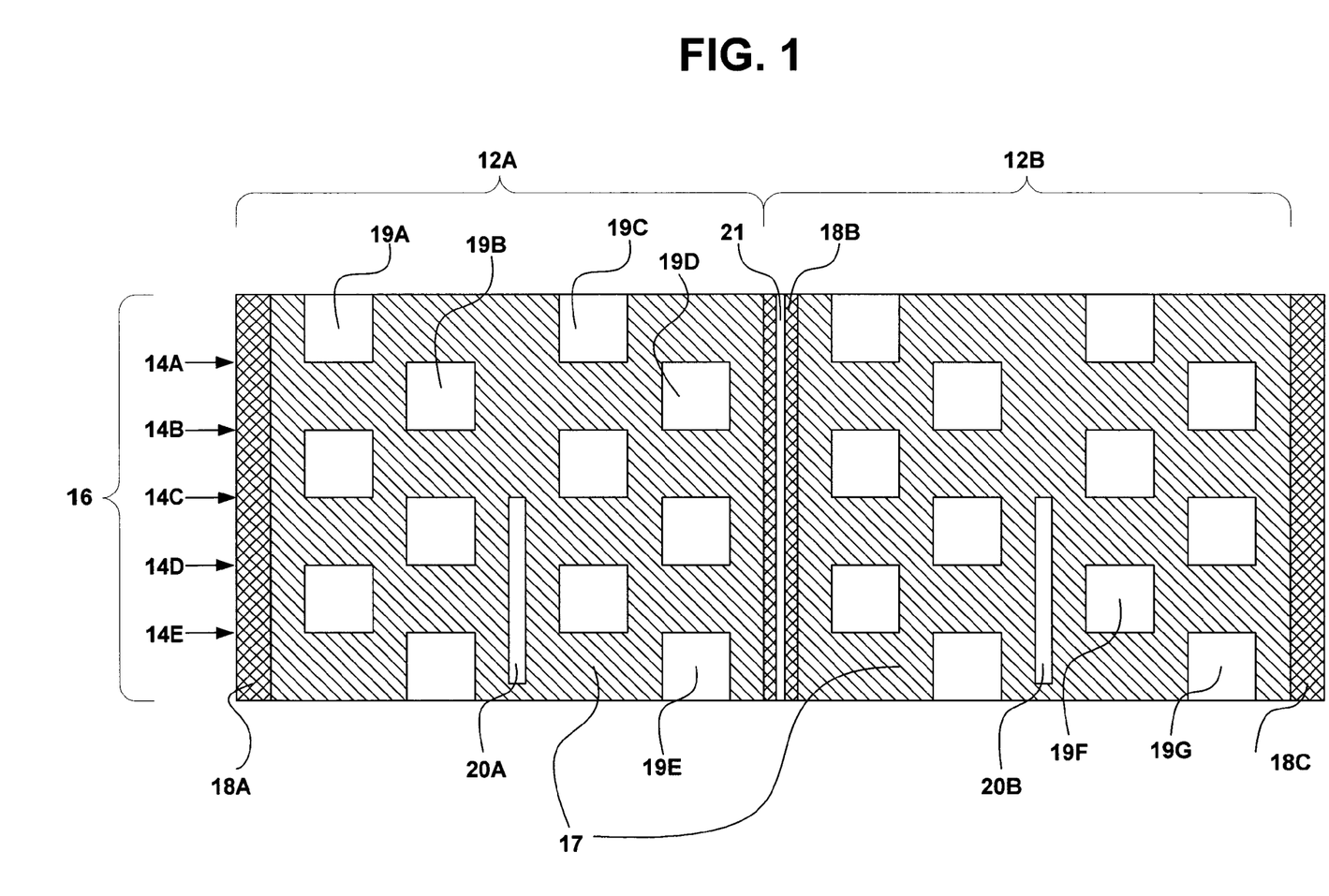
FIG. 1 illustrates servo patterns that can be pre-recorded on magnetic media.

FIG. 1 illustrates servo patterns that can be pre-recorded on magnetic media such as magnetic tape. The servo patterns illustrated in FIG. 1 are referred to as amplitude-based servo patterns. However, the invention is not limited to use with amplitude based servo patterns. For example, time-based servo patterns, including servo patterns having diamond-shaped configurations or N-shaped configurations, could also be verified according to the invention.

The servo patterns in FIG. 1 include two servo frames 12A and 12B. Each frame includes five servo tracks 14A, 14B, 14C, 14D and 14E. These five tracks collectively define a servo band 16. In general, a servo band is defined as a collection of servo tracks. Thus, a servo band could include any number of servo tracks.

The servo pattern can be written by passing the tape under gaps in a servo write head. A relatively wide gap in the servo head can be used to record a magnetic pattern having a first frequency (indicated by numeral 17). A magnetic pattern having a second frequency (indicated by numerals 18A, 18B, 18C) may define transition regions between the individual frames. These transition regions may also be encoded with single bits of longitude data, by including a longitudinal erase field within the transition region (as shown by numeral 21). For example, a longitudinal data word may be comprised of a plurality of encoded transition regions.

Smaller gaps in the servo write head (or a separate erase head) can be used to create erase fields 19. For example, erase fields 19 may form a checkerboard-like configuration that enables a read head to pinpoint track locations. For simplicity, only erase fields 19A, 19B, 19C, 19D, 19E, 19F and 19G are numbered. In operation, as the tape passes by a read head (not shown) positioned on track 1 (indicated by numeral 14A), the position of erase fields 19 relative to magnetic pattern 17 can accurately define the track location of track 1. Similarly, the track locations of tracks 2–5 (indicated by numerals 14B–14E respectively) can be defined by the various erase fields 19 relative to magnetic pattern 17.

Band identification erase fields 20A and 20B may be used to identify one band from another. In other words, the band 16 may be one of many servo bands written to the magnetic tape. Band identification erase fields 20A and 20B distinguishes band 16 from the other bands on the tape. For example, if the tape includes other bands, the other bands may have band identification erase fields that are shaped similar to fields 20A and 20B, but located in a different location within that band.

Data storage tape that implements a servo pattern similar than that illustrated in FIG. 1 utilizes the area between servo bands for storage of data. Because each band has five servo tracks, the area between servo bands may have five data tracks. Sometimes, however, a number of write heads for writing data between the servo bands are utilized with a single servo read head. In that case, more than five data tracks may be defined in the area between bands that have five servo tracks. For example, if a band has five servo tracks, and three write heads are utilized for a single servo read head, fifteen data tracks may be included between the bands.

Sometimes servo patterns, like those illustrated in FIG. 1, are not written properly. When this happens, the servo patterns may not effectively facilitate the identification of locations on the medium. Thus, if servo patterns are not written properly, the medium may be of inferior quality in terms of its data storage capabilities. Indeed, improperly written servo patterns can even result in a defective or unusable product. In general, errors in servo writing are usually caused by the collection of dust or debris on servo writing components. The debris may clog gaps in the servo write head, or cause the fly height of magnetic media relative to the write head to change. In either case, a phenomenon called "spacing loss" may occur, which can degrade the magnetic signal that is written to the media.

One particular type of error that can occur during servo writing is referred to as a "write fade." A write fade occurs when the magnetic pattern (such as that indicated by numeral 17) is not properly written. For example, as the result of a write fade, the amplitude of the alternating signal that defines the magnetic pattern 17 may be much lower than desired. Write fades can result when the recording gap of a write head that writes the magnetic pattern 17 gets contaminated with dust or debris. If debris builds up in the recording gap, the amplitude of the signal that gets written to the media can be reduced significantly.

Another type of error that can occur during servo writing is referred to as an "erase fade." An erase fade occurs when one or more erase fields 19 are not properly erased. Band identification erase fields 20A and 20B or longitudinal erase field 21 could also be affected by erase fades. For example, as the result of an erase fade, an erase field 19 may be only partially erased, or may not be erased at all. Erase fades can result when the erase gap of a write head gets contaminated with dust or debris. If debris builds up in a particular erase gap, the corresponding erase field may not be properly erased. Both write fades and erase fades may be alleviated by maintenance, e.g., by cleaning the head, but only if the errors are actually detected.

Figure 2:
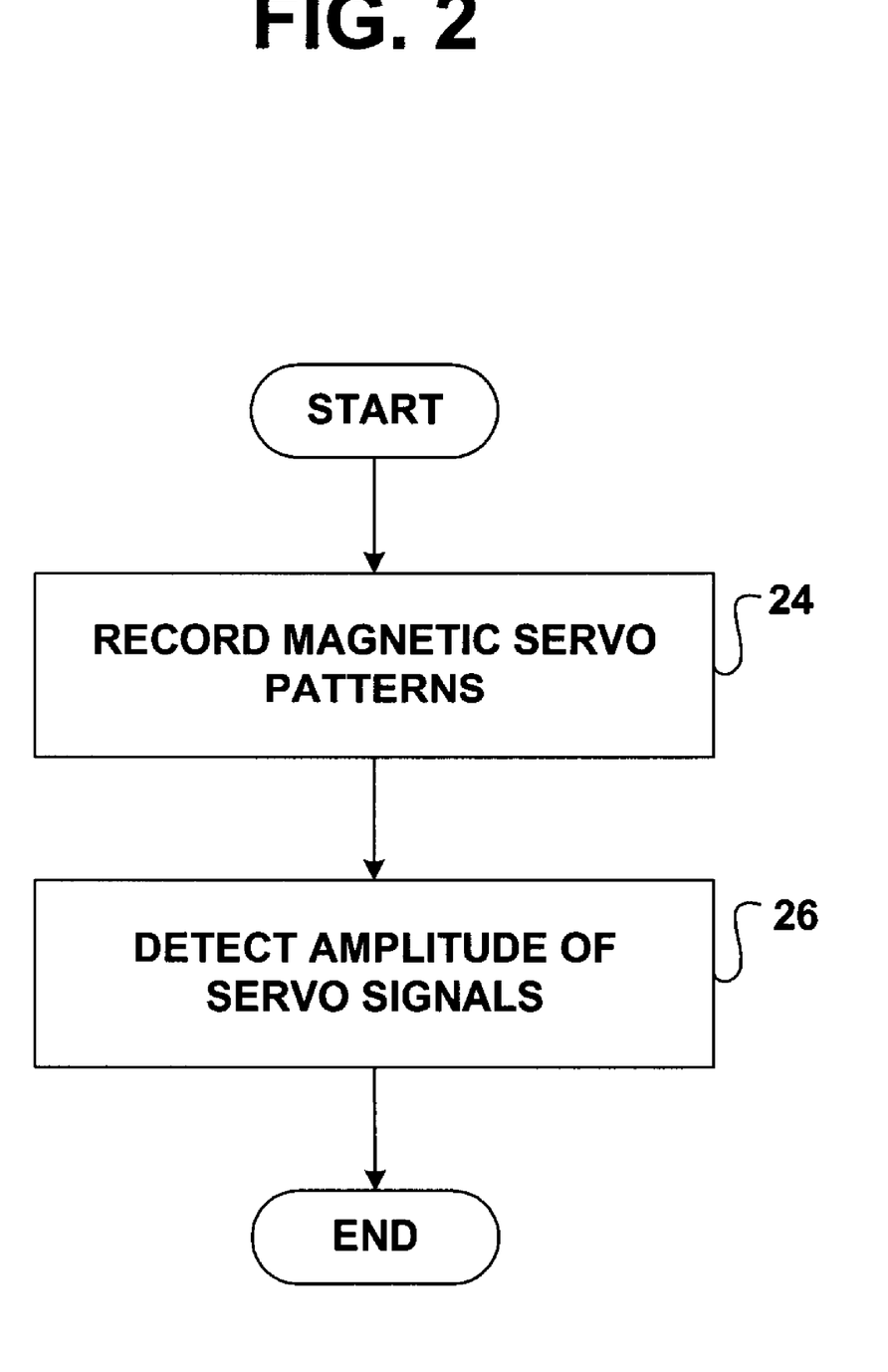
FIG. 2 is a flow diagram illustrating a method according to the invention that facilitates the detection of errors in the servo writing process.

FIG. 2 is a flow diagram illustrating a method according to the invention that facilitates the detection of errors in the servo writing process. As shown, magnetic servo patterns are recorded on the media (24). The amplitude of the servo signals are then detected (26). In this manner, write fades and/or erase fades can be detected.

As discussed in greater detail below, there are various ways for detecting the amplitude of the servo signal, i.e., the signal strength. By detecting signal strength, it can be determined whether the signal strength is too high or too low, indicating that one or more errors may have occurred in the servo writing process. For example, if the signal strength is too low, it may indicate that a write fade occurred. In that case, the amplitude of a read-back signal may be low in the magnetic pattern 17 (FIG. 1) where the write fade occurred. Similarly, if the signal is too high, it may indicate that an erase fade occurred, resulting in the presence of magnetic patterns in regions that should have been erased.

One way of detecting the amplitude of the servo signal is by integration. In particular, integration works well for continuous, single frequency, sinusoidal carrier patterns. Integration typically exhibits excellent noise immunity, but is generally sensitive to DC offsets.

Figure 3:
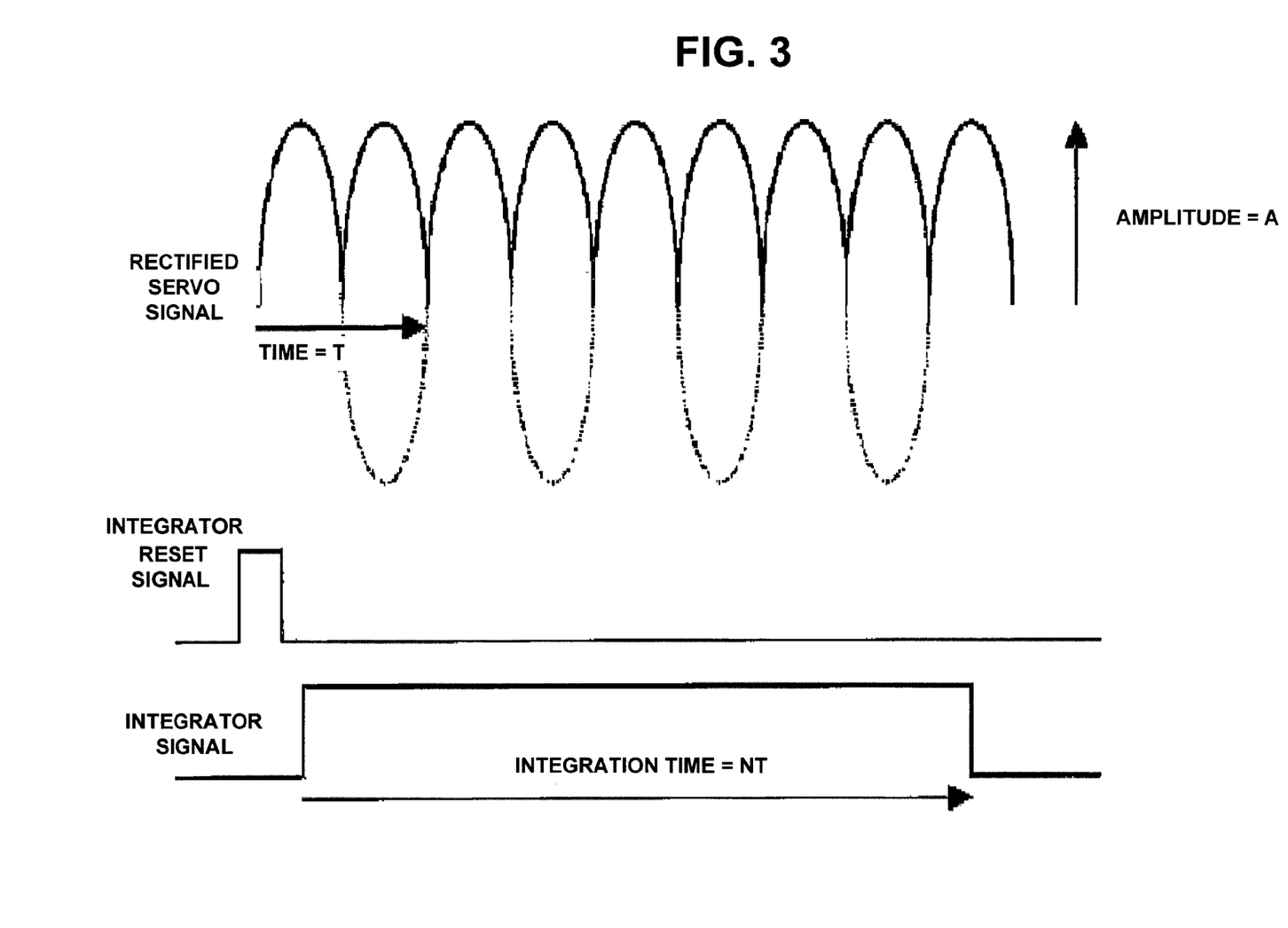
FIG. 3 is a series of three graphs illustrating integration that may be used to process servo verification signals in accordance with the invention.

FIG. 3 is a series of three graphs illustrating a process of integration. Integrators are typically implemented using a capacitor as a charge holding device. The signal being integrated is used to control the current in the capacitor. In this case, the signal being integrated is the magnetic signal of a full servo band 16 (FIG. 1). The resulting capacitor voltage is proportional to the charge on the capacitor, which is the integration of current over time. The reset signal is used to rapidly discharge the capacitor in preparation for a new integration period. The integrate signal is used to connect the capacitor to the charging circuit. At the end of the integration period, the final capacitor voltage can be captured using an analog-to-digital converter.

The integrated measurement is proportional to the signal amplitude A. The final voltage $V_F$ can be expressed as:

$$V_F = \frac{1}{\tau}\int_0^{NT} \left| A\sin\left(\frac{2\pi}{T}t + \phi\right) \right| dt$$

where $\tau$ is the time constant of the integrator circuit, N is the number of cycles, T is the period of a cycle, A is the signal amplitude, t is a unit of time, and 100 is the phase angle.

The calculation can be simplified to:

$$V_F = \frac{2N}{\tau}\int_0^{T/2} A\sin\left(\frac{2\pi}{T}t\right) dt$$

Which is simply:

$$V_F = -\frac{2NAT}{2\pi\tau}\cos\left(\frac{2\pi}{T}t\right)\Big|_0^{T/2} = -\frac{NAT}{\pi\tau}(-1-1) = \frac{2NT}{\pi\tau}A$$

Thus, $V_F$ is proportional to the signal amplitude, A.

Upon performing the integration, $V_F$ can be compared to a threshold to determine whether the Amplitude A falls within an acceptable range. If the Amplitude A does not fall within the acceptable range, then errors such as a write fade or an erase fade may have occurred. In that case, the various write heads and erase gaps can be cleaned in an attempt to remedy the problem.

Another way of detecting the amplitude of servo signals is by detecting peak signals. In particular, peak signal detection works well for servo patterns having mixed frequency patterns or pulse burst patterns. Peak signal detection, however, is more sensitive to noise than integration.

In peak signal detection, the rectified playback signal is tracked over time, and the maximum and minimum values of the tracked signal are recorded. The recorded maximum and minimum values can then be compared to thresholds to determine whether the values fall within an acceptable range of the thresholds. If the maximum or minimum values do not fall within the acceptable range, then errors such as a write fade or an erase fade may have occurred.

Figure 4:
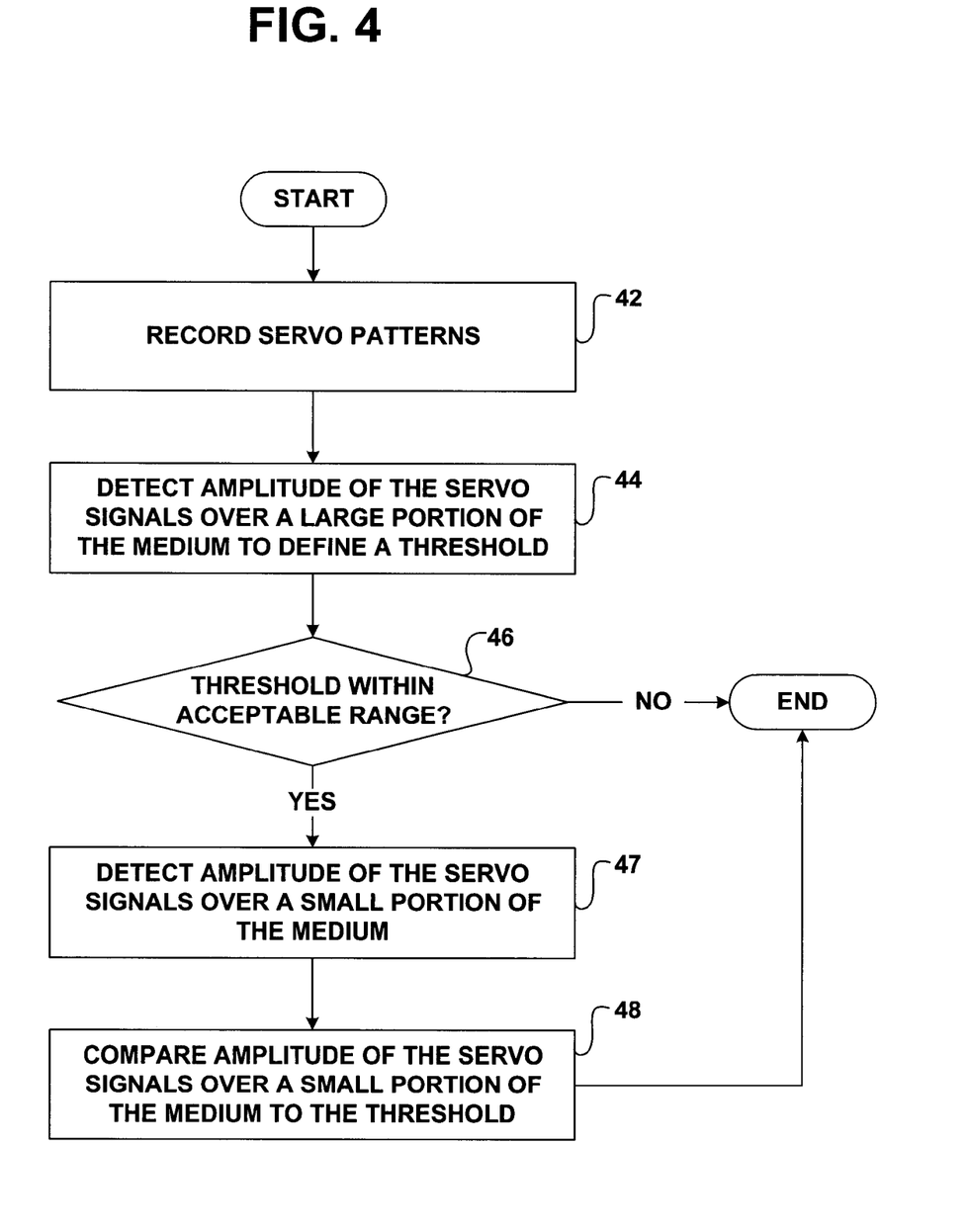
FIG. 4 is a flow diagram illustrating a servo verification process according to the invention in greater detail.

FIG. 4 is a flow diagram illustrating a servo verification process according to the invention in greater detail. As shown, servo patterns are recorded on the medium (42). The amplitude of the servo signal over a large portion of the medium is then detected to define a threshold (44). For example, the amplitude may be detected via integration. A large portion of the medium is generally defined as including greater than 1000 servo frames. For magnetic tape, a large portion of the medium may include a length of tape on the order of a meter. In that case, the large portion of the medium may include more than 80,000 servo frames.

At this point, an initial check can be made. If the threshold does not fall within an acceptable range of known reference values (46), then the process may be terminated, and the various write heads and erase gaps can be cleaned. The reference value can be set by a medium that has been tested for quality control. For example, a master reference tape that was recorded and tested may be used to set the reference values.

In one particular example, determining whether the threshold falls within an acceptable range (46) involves three separate measurements. For example, the full carrier signal on magnetic tape can be measured. This full carrier signal can then be compared against a reference value set by the master reference tape. In addition, two mean "burst signals" can be measured. The first mean burst signal is a measurement of the mean carrier signal along a track in the regions where erase fields 19 (FIG. 1) should be present above the track.

For example, referring again to FIG. 1, along track 1, 14A, the first mean burst signal is a measurement of the carrier signal in the regions along track 1, 14A, where erase fields 19A and 19C should exist. The second mean burst signal is a measurement of the mean carrier signal along a track in the regions where erase fields 19 should be present below the track. For example, along track 1, 14A, the second mean burst signal is a measurement of the carrier signal in the regions along track 1, 14A, where erase fields 19B and 19D should exist.

The first and second mean burst signals can be compared to the full carrier signal, and to one another. The mean burst signals should be a known percentage of the full carrier signal, plus or minus a defined degree of tolerance. For example, for the servo pattern illustrated in FIG. 1, the correct mean burst signals may be approximately 50% of the full carrier signal. In that case 50%+/−10% may be acceptable. In other words, if a read head is positioned along a track, the carrier signal should reduce by approximately 50% as an erase field passes by the read head.

The mean burst signals should also be a known percentage of each other, plus or minus a defined degree of tolerance. For the servo pattern illustrated in FIG. 1, the correct burst signals may be approximately 100%+/−10% of one another. In other words, if a read head is positioned along a track, the carrier signal should be approximately equal whenever an erase field passes by the head, regardless of whether the erase field is present above the track or below the track.

Having determined that the measured mean burst signals and the full carrier signals are acceptable, the threshold can be set, and an acceptable range around the threshold can be defined. This threshold and the acceptable range are used later in the verification process.

The threshold can be defined according to the measured mean burst signals. Ideally, the threshold would correspond to the signal strength on the master reference tape. However, non-problematic differences between the master reference tape and the tape being servo written often exist. For example, these differences may be related to slight variations in the read-gaps used during the verification process or slight variations in the write gaps used during servo writing. Indeed, even slight coating differences between the media can cause slight differences in read-back signals. Thus, once the initial checks ensure that the recorded patterns fall within an acceptable range of those of the master reference tape, the thresholds can be defined in terms of the actual measured characteristics on the tape that is being servo written.

Once the threshold has been defined (44) and it has been determined that the threshold falls within an acceptable range (46), the verification process continues. At this point, the amplitude of a servo signal is detected over a small portion of the medium (47) and the amplitude of the servo signal over a small portion of the medium is compared to the threshold (48).

Detecting the amplitude of the servo signal over a small portion of the medium may involve integration or peak detection as detailed above. In either case, the small portion of the medium may include a relatively few number of servo frames. For example, 100 frames may be included in the small portion of the medium. In general, a small portion of the medium is generally defined as including fewer than 1000 servo frames.

In one example, the amplitude of the servo signal over a small portion of the medium is defined by a moving average. In that case, the small portion of the medium can be viewed as a sliding window. A moving average can be calculated along the frames of a servo band by calculating the average signal strength of the sliding window. For example, if 100 frames define the window, a 100 frame moving average of signal strength can be calculated along the servo band. Of course, the moving average could be calculated to include more frames or fewer frames depending on the implementation. In other words, the sliding window could be defined to include any number of servo frames.

Comparing the threshold to the amplitude of the servo signal over a small portion of the medium (48) may involve comparing the moving average to the threshold. If the moving average falls below a lower limit relative to the threshold, e.g., the moving average falls below a certain percentage of the threshold, a write fade can be declared. Similarly, if the moving average rises above an upper limit relative to the threshold, an erase fade can be declared.

Still additional processing can be used to detect single frame fades. For example, the moving average can be defined as the reference point for single frame fade detection. In addition, upper and lower single frame error tolerance limits can be defined to be percentages of the moving average. Any time the amplitude of the signal corresponding to a single frame falls below the lower limit, a singe frame write fade can be declared. Any time the amplitude of the signal corresponding to a single frame rises above the upper limit, a single frame erase fade can be declared.

Write fades, erase fades, single frame write fades, and single frame erase fades can be tracked for each servo band of a magnetic tape. The tracking can then be analyzed to determine whether the media is suitable for use in a product. For example, media having a certain degree of write fades or erase fades may still be suitable for some applications. In particular, a small number of single frame fades may not affect the ultimate usefulness of the media. A large number of single frame fades or long term fades (defined as a fade in the moving average), however, may be more problematic.

Figure 5:
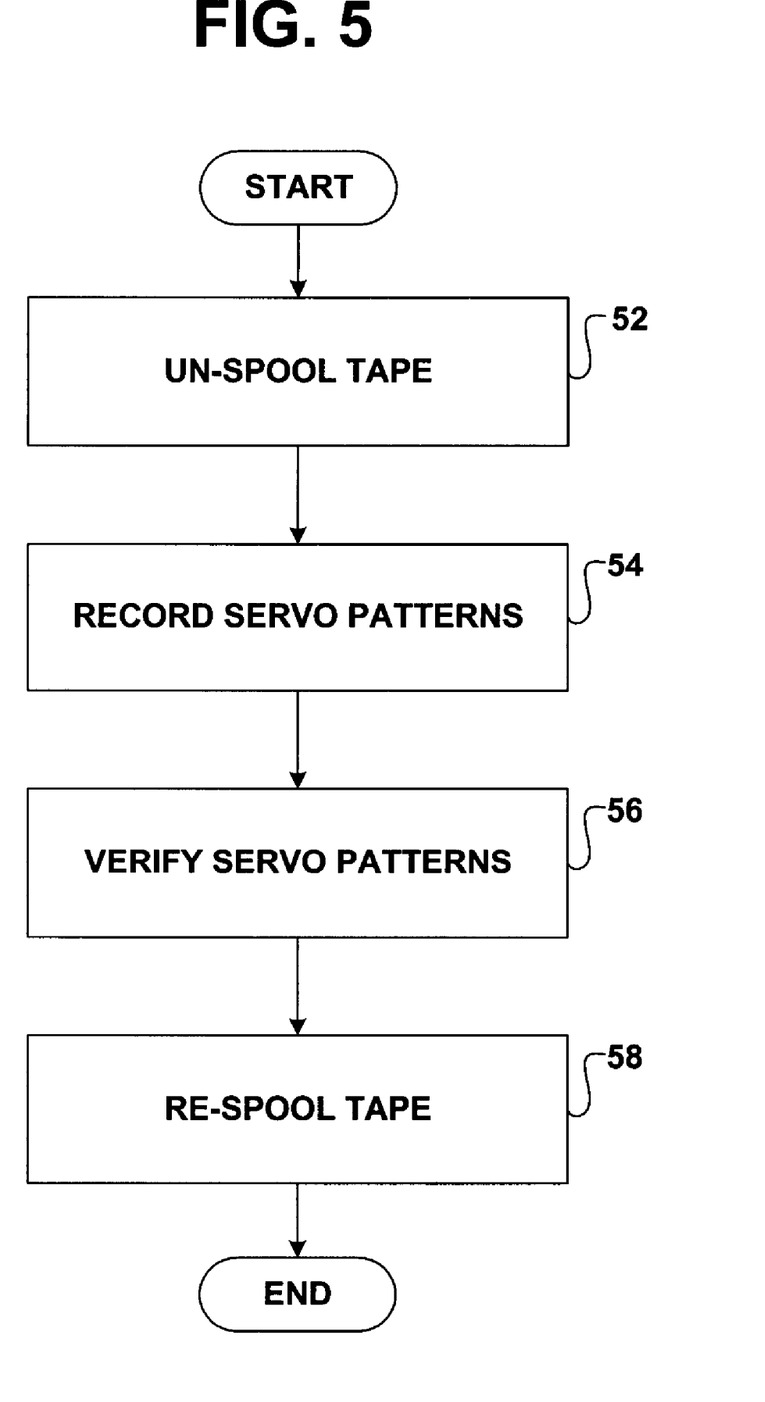
FIG. 5 is a flow diagram illustrating a method according to the invention.

FIG. 5 is a flow diagram illustrating a method according to the invention. As shown, magnetic tape is un-spooled (52) from a first spool, and servo patterns are written on the tape (54). The servo patterns can then be verified (56) using one or more of the techniques described above. The tape can then be re-spooled (58) onto a second spool.

The method illustrated in FIG. 5 provides several advantages. By verifying the servo patterns (56) after they are written (54), but before the tape is re-spooled (58), time and energy can be saved. Rather than writing servo patterns for a whole spool of tape and then checking the tape, the method of FIG. 5 integrates a servo verification process as part of the servo writing process. In this manner, problems in the servo writing process may be identified much earlier, and remedied much earlier.

Figure 6:
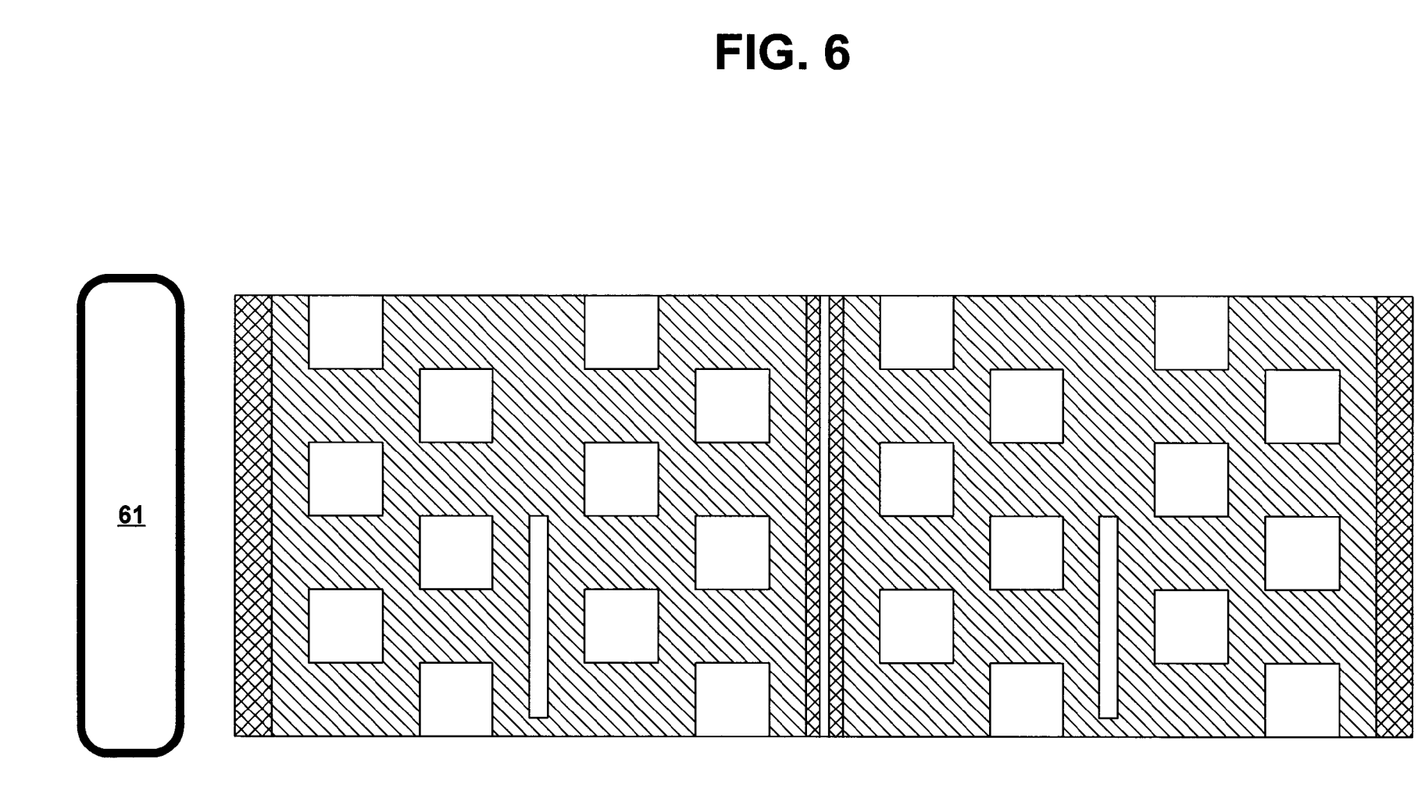
FIG. 6 illustrates the servo patterns illustrated in FIG. 1, with a servo verification head in proximity to the servo patterns.

FIG. 6 illustrates the servo patterns illustrated in FIG. 1, with a servo verify head 61 in proximity to the servo patterns. In particular, servo verify head 61 is a magnetic head having sufficient width to enable the head to simultaneously detect magnetic signal strength corresponding to more than one servo track. As illustrated in FIG. 6, the servo verify head 61 may even have sufficient width to enable the head to simultaneously detect magnetic signal strength corresponding to a full servo band. Indeed, in other embodiments, the servo verify head 61 is wide enough to enable magnetic signal detection for multiple servo bands.

In accordance with the invention, detecting the amplitude of servo signals may involve simultaneously detecting the amplitude of a signal corresponding to more than one servo track. For example, the signal for a full servo band, or even multiple servo bands may be simultaneously detected. By sizing the servo verify head 61 to have sufficient width, the signal strength corresponding to multiple tracks can be detected simultaneously. In this manner, more efficient servo verification can be achieved.

Servo verify head 61 may be coupled to circuitry that performs various signal processing consistent with the teaching above. For example, a central processing unit (CPU), various digital signal processors (DSPs), and various field programmable gate arrays (FPGAS) may be coupled to the verify head 61 to perform the various signal processing. In addition, various processing may be performed by software operating in the CPU.

Figure 7:
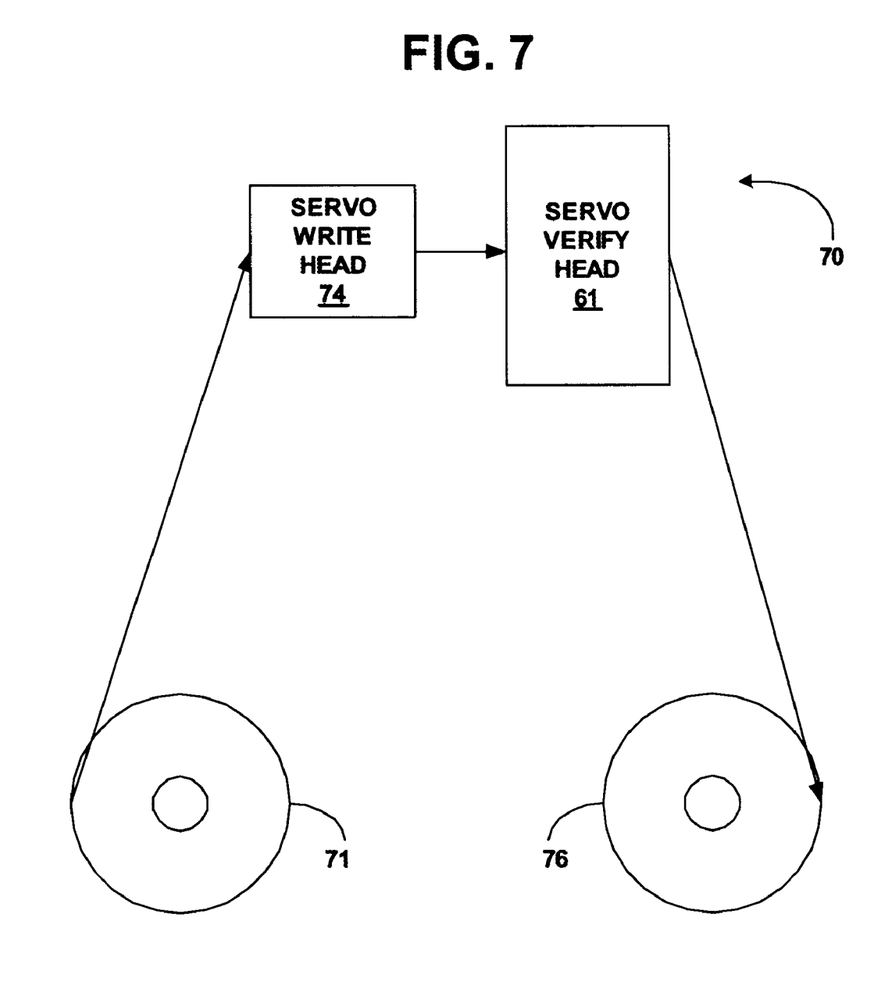
FIG. 7 is a block diagram illustrating an exemplary servo writing system.

FIG. 7 is a block diagram illustrating an exemplary servo writing system 70 for use with magnetic tape media. Servo writing system 70 includes a first spool 71 that includes spooled magnetic tape. The tape feeds out of first spool 71 and passes by a servo write head 74, which writes servos on the magnetic tape. The tape then passes by a servo verify head 61. Again, the servo verify head 61 may have sufficient width to enable the head to detect magnetic signal strength corresponding to more than one servo track. After passing by the servo verify head 61, the tape may be re-spooled on a second spool 76. Servo writing system 70 may also include various motors (not shown) and guides (not shown) for moving the tape through the system 70, various vacuum units (not shown) to ensure that the tape is taut throughout the system 70, and various cleaning stations (not shown) to wipe the tape clean.

A number of embodiments of the present invention have been described. For example, various servo verification techniques have been described that ensure that that servo patterns written on media are free of defects that may impede media quality. Nevertheless, various modifications may be made without departing from the scope of the invention. For example, the invention could be implemented with any type of servo pattern, including time-based servo patterns such as diamond shaped servo patterns or N-shaped servo patterns. In addition, the invention could be used with other magnetic media that makes use of pre-recorded servo patterns, such as magnetic disks, or the like. Accordingly, other embodiments are within the scope of the following claims.

What is claimed is:

1. A method comprising:

recording time based magnetic servo patterns on a magnetic medium;

detecting an amplitude of a signal corresponding to the time based magnetic servo patterns over a relatively large portion of the medium to define a threshold;

determining whether the threshold falls within an acceptable range;

detecting an amplitude of a signal corresponding to the time based magnetic servo patterns over a relatively small portion of the medium; and comparing the amplitude of the signal corresponding to the time based magnetic servo patterns over a relatively small portion of the medium to the threshold.

2. The method of claim 1, wherein detecting an amplitude of the signal corresponding to the time based magnetic servo patterns over a relavely large portion of the medium includes a process of integration.

3. The method of claim 1, wherein detecting an amplitude of the signal corresponding to the time based magnetic servo patterns over a relatively small portion of the medium includes a process of integration.

4. The method of claim 1, wherein detecting an amplitude of the signal corresponding to the time based magnetic servo patterns over a relatively small portion of the medium includes detecting a peak signal.

5. A method comprising:

un-spooling magnetic tape from a first spool;

recording time based magnetic servo patterns on the magnetic tape including recording a servo band, the servo band including a number of servo tracks;

verifying the time based magnetic servo patterns prior to re-spooling the magnetic tape including detecting an amplitude of a signal for the full servo band and comparing the amplitude to a threshold; and re-spooling the magnetic tape onto a second spool.

6. The method of claim 5, wherein verifying the time based magnetic servo patterns comprises detecting a peak signal corresponding to the servo band and comparing the peak signal to the threshold.

7. The method of claim 5, further comprising establishing the threshold.

8. The method of claim 5, further comprising determining whether the amplitude of the signal falls within an acceptable range in relation to the threshold.

9. A method comprising:

un-spooling magnetic tape from a first spool;

recording time based magnetic servo patterns on the magnetic tape including recording a servo band, the servo band including a number of servo tracks;

verifying the time based magnetic servo patterns prior to re-spooling the magnetic tape including detecting an amplitude of a signal for the servo band and comparing the amplitude to a threshold; and re-spooling the magnetic tape onto a second spool, wherein verifying the time based magnetic servo patterns comprises integrating signal strength corresponding to the servo band over a period of time and comparing the integrated signal strength to the threshold.

10. A method comprising:

un-spooling magnetic tape from a first spool;

recording time based magnetic servo patterns on the magnetic tape including recording a servo band, the servo band including a number of servo tracks;

verifying the time based magnetic servo patterns prior to re-spooling the magnetic tape including detecting an amplitude of a signal over a relatively large length of the magnetic tape to establish a threshold, detecting an amplitude of a signal for the servo band, and comparing the amplitude to the threshold; and re-spooling the magnetic tape onto a second spool.

11. The method of claim 10, wherein the relatively large length of the tape has a length on the order of one meter.

12. A method comprising:

un-spooling magnetic tape from a first spool;

recording time based magnetic servo patterns on the magnetic tape including recording a servo band, the servo band including a number of servo tracks;

verifying the time based magnetic servo patterns prior to re-spooling the magnetic tape including integrating signal strength over the relatively large length of the magnetic tape to establish a threshold, detecting an amplitude of a signal for the servo band, and comparing the amplitude to the threshold; and re-spooling the magnetic tape onto a second spool.

13. A method comprising:

recording time based magnetic servo patterns on a magnetic medium; and detecting an amplitude of a signal corresponding to the time based magnetic servo patterns to determine whether the time based magnetic servo patterns have been properly recorded, wherein detecting the amplitude of the signal comprises integrating the signal amplitude corresponding to the time based servo patterns over a period of time.

14. The method of claim 13, wherein detecting the amplitude of the signal comprises detecting a peak signal corresponding to the time based servo patterns.

15. A method comprising:

recording magnetic servo patterns on a magnetic medium;

detecting an amplitude of a signal corresponding to the magnetic servo patterns over a relatively large portion of the medium to define a threshold;

determining whether the threshold falls within an acceptable range;

detecting an amplitude of a signal corresponding to the magnetic servo patterns over a relatively small portion of the medium by detecting a peak signal; and comparing the amplitude of the signal corresponding to the magnetic servo patterns over a relatively small portion of the medium to the threshold.

* * * * *